United States Patent [19]
Makino et al.

[11] Patent Number: 5,817,238
[45] Date of Patent: Oct. 6, 1998

[54] PROCESS FOR PRODUCING PURIFIED L-ASCORBIC ACID

[75] Inventors: Kaoru Makino, Yamaguchi; Kazuhiro Kawai, Hyogo; Masatake Tanimura; Masao Tamura, both of Tokyo, all of Japan

[73] Assignee: Nippon Rensui Co., Tokyo, Japan

[21] Appl. No.: 816,519

[22] Filed: Mar. 13, 1997

Related U.S. Application Data

[63] Continuation of Ser. No. 577,010, Dec. 26, 1995, abandoned.

[30] Foreign Application Priority Data

Dec. 26, 1994 [JP] Japan .................................... 6-322158

[51] Int. Cl.⁶ .................................................. B01D 15/08
[52] U.S. Cl. ...................................... 210/659; 210/198.2
[58] Field of Search .................................... 210/635, 656, 210/659, 198.2; 546/315; 435/280

[56] References Cited

U.S. PATENT DOCUMENTS

| | | | |
|---|---|---|---|
| 2,443,583 | 6/1948 | Mottern | 549/315 |
| 4,159,990 | 7/1979 | Andrews | 549/315 |
| 4,182,633 | 1/1980 | Ishikawa et al. | 127/46 |
| 4,212,988 | 7/1980 | Andrews | 549/315 |
| 4,767,870 | 8/1988 | Fujiwara | 549/315 |
| 4,778,902 | 10/1988 | Fujiwara | 549/315 |
| 5,064,539 | 11/1991 | Tanimura et al. | 210/659 |
| 5,122,275 | 6/1992 | Rasche | 210/659 |
| 5,126,055 | 6/1992 | Yamashita | 210/659 |
| 5,391,770 | 2/1995 | LeFur | 549/315 |
| 5,434,298 | 7/1995 | Negawa | 210/659 |
| 5,457,214 | 10/1995 | O'Donnell | 549/315 |
| 5,468,850 | 11/1995 | Mandai | 549/315 |
| 5,498,752 | 3/1996 | Negawa | 210/659 |
| 5,518,625 | 5/1996 | Priegnitz | 210/659 |

FOREIGN PATENT DOCUMENTS

| | | | |
|---|---|---|---|
| 465875 | 6/1950 | Canada | 549/315 |
| 534117 | 12/1956 | Canada | 549/315 |
| 391406 | 2/1964 | Japan | 549/315 |
| 4021767 | 9/1965 | Japan | 549/315 |
| 50-111062 | 9/1975 | Japan | 549/315 |
| 53-98955 | 8/1978 | Japan | 549/315 |
| 2-49159 | 2/1990 | Japan | 210/198.2 |
| 945538 | 1/1964 | United Kingdom | 549/315 |
| 2034315 | 6/1980 | United Kingdom | 549/315 |

*Primary Examiner*—Ernest G. Therkorn
*Attorney, Agent, or Firm*—Foley & Lardner

[57] ABSTRACT

A process for producing purified L-ascorbic acid, which comprises subjecting an aqueous solution of crude L-ascorbic acid to column chromatography using a strongly acidic cation exchange resin; and a method of purifying L-ascorbic acid, which comprises subjecting an aqueous solution of crude L-ascorbic acid to column chromatography using a strongly acidic cation exchange resin.

12 Claims, 3 Drawing Sheets

PROCESS FOR PRODUCING PURIFIED L-ASCORBIC ACID

This application is a continuation of application Ser. No. 08/577,010, filed Dec. 26, 1995, now abandoned.

FIELD OF THE INVENTION

The present invention relates to a process for producing purified L-ascorbic acid. Specifically, the present invention relates to a process for producing purified L-ascorbic acid from an aqueous solution containing crude L-ascorbic acid.

BACKGROUND OF THE INVENTION

L-Ascorbic acid (vitamin C) has been produced by combined processes of fermentation processes and chemical synthesis processes from the starting compound glucose. As the industrially practical combined processes, the process through an ester and the direct ring-closure processes (DAGA direct process and 2KGA direct process) operated under acidic conditions described below are known.

(1) The process through an ester: Glucose→L→Sorbose→DAS (diacetone-L-sorbose) →DAGA (diacetone-2-keto-L-gulonic acid)→ACS (sodium L-ascorbate)→VC (L-ascorbic acid)

(2) DAGA direct process: Glucose→L-Sorbose→DAS→DAGA→VC (3) 2KGA direct process: Glucose→L-Sorbose→2KGA (2-keto-L-gulonic acid)→VC In the purification step of L-ascorbic acid obtained by these processes, L-ascorbic acid is separated and purified by crystallization, and the resulting crystallization mother liquor contains a large amount of the residual desired product L-ascorbic acid as well as other organic acids and salts as by-products. However, there is no industrially efficient process for effectively isolating and recovering L-ascorbic acid from the above-described crystallization mother liquor. Therefore the crystallization mother liquor has been discarded as a waste, and the discard is a major cause of L-ascorbic acid loss.

OBJECTS OF THE INVENTION

The main object of the present invention is to provide a process for producing purified L-ascorbic acid from an aqueous solution containing crude L-ascorbic acid, such as a crude mixture before separation or purification of L-ascorbic acid or a mother liquor obtained after isolation and recovery of L-ascorbic acid by crystallization, etc.

This object as well as other objects and advantages of the present invention will become apparent to those skilled in the art from the following description with reference to the accompanying drawings.

SUMMARY OF THE INVENTION

The present inventors have intensively studied to achieve the above objectives. As a result, it has been found that L-ascorbic acid can very effectively and efficiently be separated from other coexisting components by subjecting an aqueous solution of crude L-ascorbic acid containing L-ascorbic acid to column chromatography using a strongly acidic cation exchange resin (in particular, strongly acidic cation exchange resin prepared as H-form or salt form) as an adsorbent and water as an eluant. Thus, the present invention has been accomplished.

Accordingly, the present invention provides a process for producing purified L-ascorbic acid, which comprises subjecting an aqueous solution of crude L-ascorbic acid to column chromatography, normally liquid column chromatography, using a strongly acidic cation exchange resin.

The present invention also provides a method of purifying L-ascorbic acid, which comprises subjecting an aqueous solution of crude L-ascorbic acid to column chromatography using a strongly acidic cation exchange resin.

The process of the invention relatively increases the L-ascorbic acid purity in solid materials contained in the solution, and thereby can effectively and efficiently produce purified L-ascorbic acid from an aqueous solution of crude L-ascorbic acid. In particular, the process of the invention is preferably applied to an aqueous solution of crude L-ascorbic acid containing 2-keto-L-gulonic acid, such as a crystallization mother liquor obtained in an L-ascorbic acid production process. In addition, column chromatography by a simulated moving bed process can produce purified L-ascorbic acid more efficiently.

DETAILED DESCRIPTION OF THE INVENTION

Figure 1:
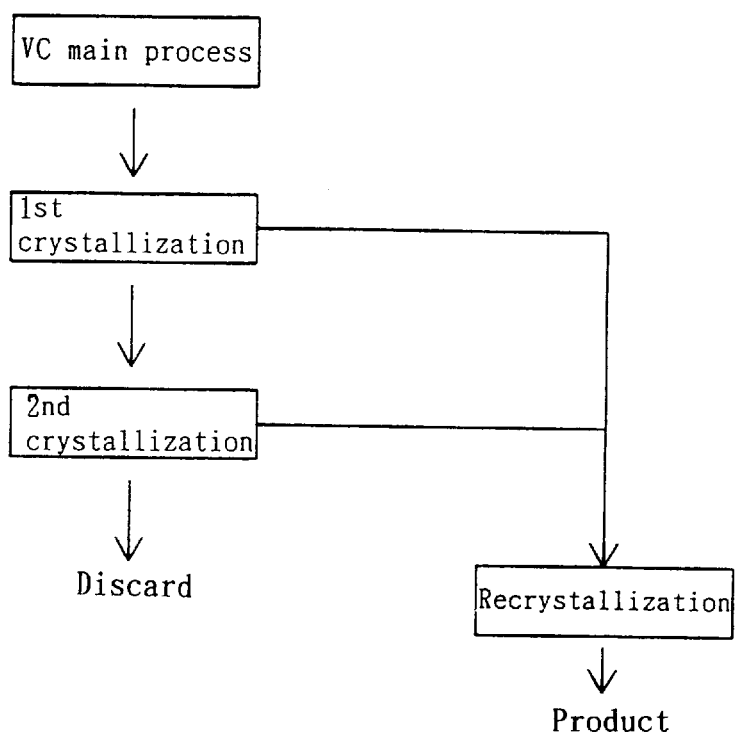
FIG. 1 is a flow chart showing a conventional process for purifying L-ascorbic acid.

The cation exchange resins to be used in the invention are not specifically limited. Examples of the cation exchange resins include sulfonated styrene-divinylbenzene copolymers. Preferred examples of such cation exchange resins include commercially available strongly acidic cation exchange resins such as DIAION™ SK-1B, SK104 and SK-106 (manufactured by Mitsubishi Chemical Cooperation), AMBERLITE™ IR120B, IR122 (manufactured by Rohm & Haas Co.), DOWEX™ HCR-S (manufactured by Dow Chemical Co.), LEWATIT™ S100, S109, SP112, SP120 (manufactured by Bayer), etc. In particular, strongly acidic cation exchange resins having a narrow particle size distribution for industrial chromatography, such as UBK-530, UBK-550 (manufactured by Mitsubishi Chemical Cooperation), are more preferred because their separation efficiency is high.

The resin is used after preparing it in an ion form such as H-form or a salt form (e.g., Na-form, K-form, Ca-form). Normally, the resin is used as a resin of H-form, Na-form or a mixture thereof prepared depending on the equilibrium between $H^+$ and Na concentrations of the raw material in the strongly acidic cation exchange resin.

The aqueous solution of crude L-ascorbic acid from which purified L-ascorbic acid is produced in the invention is not specifically limited. In general, a solution obtained in L-ascorbic acid production is used. In particular, a solution obtained in a purification step of an L-ascorbic acid production process is preferably used. The aqueous solution of crude L-ascorbic acid contains, in addition to L-ascorbic acid, other organic acids such as 2-keto-L-gulonic acid as the starting compound or by-product, furoylformic acid (α-oxo-2-furanacetic acid, abbreviated as FFA) as the by-product, etc., and sodium chloride. The aqueous solution of crude L-ascorbic acid is, for example, a solution containing L-ascorbic acid in 0.01 to 50 W/V %, normally 10 to 40 W/V %, preferably 15 to 23 W/V %, 2-keto-L-gulonic acid in 0 to 10 W/V %, normally 0 to 4 W/V %, furoylformic acid in 0 to 10 W/V %, normally 0 to 3 W/V%, and sodium chloride in 0 to 20 W/V %, normally 0 to 4 W/V%. As described above, because the process of the invention can efficiently separate L-ascorbic acid from 2-keto-L-gulonic acid, the aqueous solution of crude L-ascorbic acid is preferably a crystallization mother liquor obtained in a purification step of L-ascorbic acid production.

The column chromatography in the invention can be conducted by per se known methods. For example, a given amount of the aqueous solution of crude L-ascorbic acid is supplied to the top of the cation exchange resin packed in a column. Then, water as an eluant is supplied to the top of the column. At the same time, while withdrawing the liquid from the bottom of the column, the amount of the effluent is preferably adjusted so that the liquid level is kept slightly higher than the resin level. The liquid initially eluting from the bottom of the column contains little L-ascorbic acid and contains other dissolved solids as major components. Thereafter, an L-ascorbic acid-enriched liquid elutes. When the L-ascorbic acid fractions are recovered, the L-ascorbic acid purity in the fractions is higher than the L-ascorbic acid purity in the feed. Thus, this process can relatively increase the L-ascorbic acid purity, and L-ascorbic acid can be recovered. This process is referred to as the single bed process or the single column process, and can be operated at a column temperature of 5° to 40° C.

Preferred industrial chromatography techniques to be used in the invention include a simulated moving bed process. The simulated moving bed process is a kind of separation method by liquid chromatography. Unlike the single bed processes, the simulated moving bed process is characterized by using four or more packed beds. The simulated moving bed process has a higher utilization efficiency of an adsorbent than a single bed process, and reduces the amount of the eluant to be used. Thus, it is suitable for large-scale separation. The simulated moving bed process can be outlined as follows.

The simulated moving bed process uses many unit beds packed with a solid adsorbent. These unit beds are connected in series to form a loop path, and a fluid containing the sorbed component and the non-sorbed component to the solid adsorbent is circulated in one direction in the unit packed beds. The fluid to be treated containing two or more components is introduced in the direction of the circulating liquid flow. The withdrawal port of the liquid containing components that are slightly adsorbable on the solid adsorbent, the supply port of the eluant and the withdrawal port of the liquid containing strongly adsorbable components are situated at intervals in the unit packed beds connected in the loop path. At the same time, the ports for supplying the liquid to be treated and the eluant and the ports for withdrawing the liquid containing slightly adsorbable components and the liquid containing strongly adsorbable components are successively and intermittently shifted one unit bed forward in the direction of the circulating liquid flow.

Although the concentration distribution of each component moves continuously, the supply opening port and the withdrawal opening port are switched intermittently. Therefore the composition of the effluent during unit operation (i.e., operation with respect to one unit bed) is changed with the passage of time. In order to obtain high separability, it is necessary to use many unit packed beds to shorten the withdrawal range of the concentration distribution movement. However, if the number of the unit packed beds increases, the apparatus becomes complicated and expensive. Normally, in view of the cost and separation efficiency of the apparatus, the apparatus is provided with 6 to 24 unit packed beds.

Particularly preferred simulated moving bed processes for such chromatography include the simulated moving bed process disclosed in JP-A 2-49159 of Mitsubishi Kasei Engineering Company. The process disclosed in this publication is hereinafter referred to as the improved simulated moving bed process. The simulated moving bed is composed of the least number of unit packed beds. That is, the number of the unit packed beds is four. The following features of the improved simulated moving bed process can provide high separation efficiencies.

That is, in conventional simulated moving beds, the supply and withdrawal of the liquid during unit operation can be conducted at a constant rate, and great time-course changes of the composition of the withdrawn liquid are observed. On the other hand, the unit operation of the improved simulated moving bed process comprises two stages of (1) a feed-withdrawal stage which comprises supplying a feed stock and an eluant to beds, and at the same time withdrawing a non-adsorptive fluid and an adsorptive fluid; and (2) a circulation stage which comprises moving the fluid in the beds in the downstream direction without supplying the fluid to the packed beds and without withdrawing the fluid from the packed beds.

In conventional simulated moving bed processes, because the liquid is withdrawn from a fixed position while the concentration distribution in the bed moves in one unit packed bed, the time-course changes of the composition of the effluent are the same as the concentration distribution distributed in the unit packed beds. On the other hand, in the improved simulated moving bed process, because the liquid is withdrawn only during a part of the course of the concentration distribution movement, the time-course changes of the composition of the effluent can be reduced to ½ to ⅕ of the concentration distribution distributed in the unit packed bed. Thus, high separation efficiencies can be obtained in spite of the small number of the unit packed beds.

The improved simulated moving bed process can be applied to separations on various scales, i.e. laboratory scales to industrial scales. The temperature, the supply rate of the feed stock and the eluant, the withdrawal rate of the non-adsorptive fluid and the adsorptive fluid, the circulation rate of the fluid in the beds can appropriately be determined depending on the capacity of the apparatus. The temperature is not specifically limited so long as the stability of vitamin C is maintained. The temperature is normally 0° to 45° C., preferably 5° to 40° C. The ratio of the average of flow rate of the treated feed stock to the amount volume of the adsorbent is 0.01 to 0.15, preferably 0.02 to 0.06. The ratio of the amount volume of the eluant to the amount of the feed stock is 1 to 10, preferably 1.5 to 3.

The resin can be regenerated by per se known methods and used again.

When a crystallization mother liquor obtained in a purification step of L-ascorbic acid production is used as the aqueous solution of crude L-ascorbic acid, the process of the invention can be operated as follows.

The purification step of L-ascorbic acid production varies with the production process. For example, in conventional processes, the purification step has been carried out by the process shown in FIG. 1. In this process, the mother liquor after obtaining the second crystals contains a large amount of desired L-ascorbic acid. However it has been discarded because there is no efficient method for separating the L-ascorbic acid from by-products such as other organic acids and salts.

Figure 2:
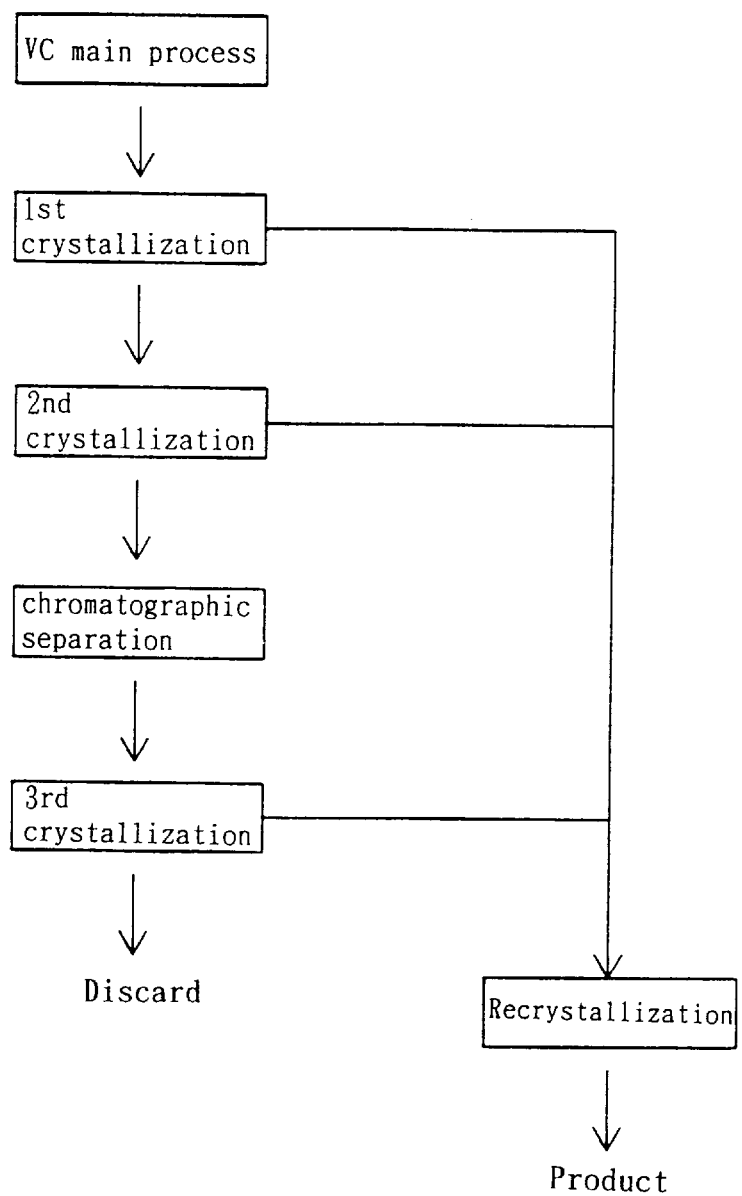
FIG. 2 is a flow chart showing an example of a process for producing purified L-ascorbic acid of the present invention.

In the invention, as shown in FIG. 2, the second crystallization mother liquor is subjected to column chromatography of the simulated moving bed process to separate and remove impurities such as 2-keto-L-gulonic acid, FFA, sodium chloride, etc., from the system. The L-ascorbic acid purity in the solid materials can thus be relatively increased. In combination with crystallization of the eluate obtained by the column chromatographic separation (i.e., third crystallization), L-ascorbic acid can be recovered from the discarded mother liquor. The third crystallization can be conducted in the same manner as in the previous two crystallization methods (i.e. first and second crystallizations).

Figure 3:
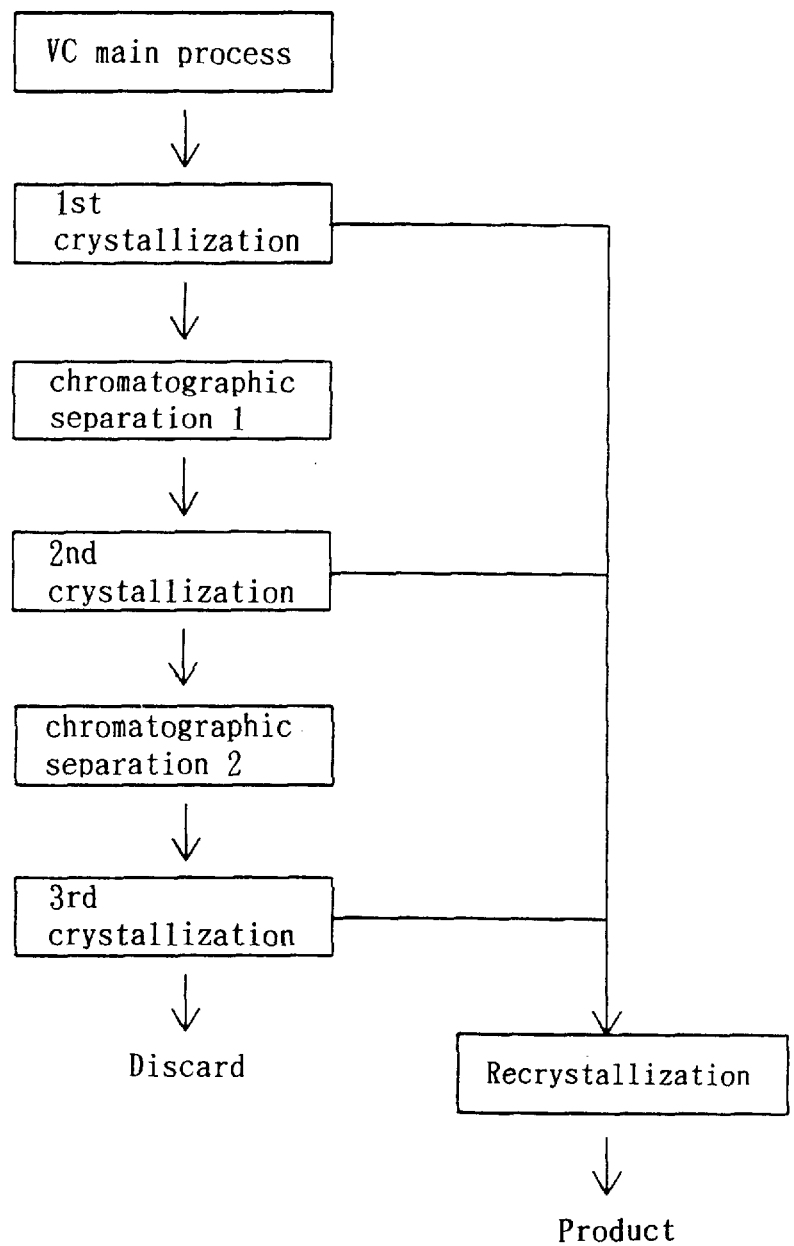
FIG. 3 is a flow chart showing another example of a process for producing purified L-ascorbic acid of the present invention.

Alternatively, as shown in FIG. 3, the mother liquor after the first crystallization is subjected to chromatographic separation followed by the second crystallization to obtain the second crystals in a high yield and in a higher purity than in the conventional processes. This is because the contamination of the crystals with the impurities such as 2-keto-L-gulonic acid, FFA, sodium chloride, etc., in the crystallization can be inhibited by separating and removing the impurities from the system to relatively increase the L-ascorbic acid purity in the solid materials. This is also because the impurities hardly crystallize even if the ratio of the amount of the crystallized L-ascorbic acid to the total amount of L-ascorbic acid is increased.

As described above, the present invention provides an industrial process for effectively and efficiently producing purified L-ascorbic acid from an aqueous solution of crude L-ascorbic acid. In particular, the process of the invention can preferably be applied to the case where the aqueous solution of crude L-ascorbic acid contains 2-keto-L-gulonic acid, particularly to a mother liquor obtained in a crystallization step in L-ascorbic acid production.

The following examples further illustrate the present invention in detail but are not to be construed to limit the scope thereof.

EXAMPLE 1

A column of 17 mm diameter was packed with the strongly acidic cation exchange resin UBK-530 H-form (manufactured by Mitsubishi Chemical Cooperation) so that the resin contained no air and the resin height became 740 mm. The water level was adjusted so as to be slightly higher than the resin level. The raw solution (8 ml) to be treated having the composition shown in Table 1 was supplied. Then, water was supplied at a flow rate of 100 ml/hr and at the same time the liquid was withdrawn at the same rate. The operation temperature was constant (20° C.). The aqueous solution of crude L-ascorbic acid (vitamin C) as the raw solution to be treated was a crystallization mother liquor of L-ascorbic acid obtained in the purification step of L-ascorbic acid production.

TABLE 1

|  | Raw solution | Pre-VC fraction | VC fraction |
| --- | --- | --- | --- |
| Amount of liquid (ml) | 8 | 12 | 36 |
| VC concentration (W/V %) | 18.63 | 0.33 | 4.19 |
| 2KGA concentration (W/V %) | 1.38 | 0.75 | 0.00 |
| Recovery ratio of VC (%) | — | 2.6 | 97.4 |

In Table 1, VC is L-ascorbic acid, and 2KGA is 2-keto-L-gulonic acid. As shown in Table 1, the raw solution was separated into the pre-VC fraction and the VC fraction.

Quantitative analysis was conducted using high performance liquid chromatography (HPLC) under the following conditions, and the amount of VC was determined by iodometric titration (the same quantitative analyses were conducted in the examples hereinafter).

HPLC conditions

Column: HPX-87 H (Bio Rad); Moving bed: 0.1M ammonium sulfate; Detector: Differential refractometer;

EXAMPLE 2

A pilot apparatus for the improved simulated moving bed process (manufactured by Mitsubishi Kasei Engineering Company; provided with 4 columns, each column being 30 cm in diameter and 150 cm in height; packing capacity of resin being 295 liters) was packed with the cation exchange resin UBK-530 H-form manufactured by Mitsubishi Chemical Cooperation. An L-ascorbic acid crystallization mother liquor containing 2-keto-L-gulonic acid (i.e., raw solution) was passed through the columns at an average flow rate of 16.23 liters/hr, and eluting water was passed through the columns at an average flow rate of 35.71 liters/hr. At the same time, the recovered solution of the purified L-ascorbic acid (recovered solution) and impurities-enriched waste were withdrawn. The operation temperature was room temperature (15° C.). The results obtained at the steady operation 24 hours after passing the liquid are shown in Table 2.

TABLE 2

|  | Raw solution | Recovered solution | Waste |
| --- | --- | --- | --- |
| Flow rate (liter/hr) | 16.23 | 22.26 | 29.68 |
| VC concentration (W/V %) | 20.63 | 14.80 | 0.35 |
| 2KGA concentration (W/V %) | 3.45 | 0.31 | 1.57 |
| Recovery ratio of VC (%) | — | 98.0 | 2.0 |

EXAMPLE 3

The same apparatus as that in Example 2 was used. As an adsorbent, UBK-530 Na-form (manufactured by Mitsubishi Chemical Cooperation) was used. The L-ascorbic acid crystallization mother liquor that would have been discarded in conventional processes shown in FIG. 1 (i.e., second crystallization mother liquor) and eluant water were passed through the pilot apparatus for the improved simulated moving bed process at average flow rates of 16.23 liters/hr and 35.70 liters/hr, respectively. At the same time, the purified recovered solution and waste were obtained. At this time, the operation temperature was ordinary temperature (10° to 30° C.). The results obtained at the steady operation 24 hours after passing the liquid are shown in Table 3.

TABLE 3

|  | Raw solution | Recovered solution | Waste |
|---|---|---|---|
| Flow rate (liter/hr) | 16.23 | 23.70 | 28.22 |
| VC concentration (W/V %) | 15.17 | 10.71 | 0.29 |
| 2KGA concentration (W/V %) | 2.12 | 0.00 | 1.25 |
| FFA concentration (W/V %) | 0.57 | 0.00 | 0.40 |
| NaCl concentration (W/V %) | 1.59 | 0.20 | 0.81 |
| Recovery ratio of VC (%) | — | 97.1 | 2.9 |

Then, the recovered solution thus obtained (200 g in terms of VC; 1867.4 ml) was concentrated to a concentration ratio of 48.0% with a rotary evaporator. At this time, the temperature of the solution was 40° C., and the degree of vacuum was 50 Torr. The solution was further concentrated to a concentration ratio of 59.0% in a 1 liter separable flask. At this time, the temperature of the solution was 45° C., and the degree of vacuum was 73 Torr. Thereafter, the solution was cooled to 5° C. over 3 hours. The slurry thus obtained was filtered through a glass filter and washed with cooled water (100 ml), and the crystals were dried in vacuo at 40° C. for 12 hours. The purity of the crystals thus obtained was 99.9%, and the yield (i.e., a ratio (W/W %) of the resulting crystallized L-ascorbic acid to that of the concentrate) was 67.3%. The concentration ratio was calculated from the following formula.

$$\text{Concentration ratio } (W/W \%) = \frac{(\text{Weight of } VC \text{ in the concentrate})}{(\text{Weight of the concentrate})} \times 100$$

EXAMPLE 4

Using the same apparatus and adsorbent as those in Example 3, the same L-ascorbic acid crystallization mother liquor as in Example 3 and eluting water were passed through the apparatus (i.e., the pilot apparatus for the improved simulated moving bed process) at average flow rates of 8.12 liters/hr and 17.85 liters/hr, respectively. At the same time, the purified recovered solution and waste were obtained. The operation temperature was ordinary temperature (15° C.). The results obtained at the steady operation 24 hours after passing the liquid are shown in Table 4.

TABLE 4

|  | Raw solution | Recovered solution | Waste |
|---|---|---|---|
| Flow rate (liter/hr) | 8.12 | 11.85 | 14.11 |
| VC concentration (W/V %) | 16.36 | 9.92 | 0.05 |
| 2KGA concentration (W/V %) | 2.61 | 0.00 | 0.74 |
| FFA concentration (W/V %) | 0.51 | 0.00 | 0.27 |
| NaCl concentration (W/V %) | 1.68 | 0.20 | 0.74 |
| Recovery ratio of VC (%) | — | 99.5 | 0.5 |

EXAMPLE 5

Using the same apparatus and resin as those in Example 3, the L-ascorbic acid crystallization mother liquor (first crystallization mother liquor) obtained in the process shown in FIG. 3 and eluting water were passed at average flow rates of 16.23 liters/hr and 35.70 liters/hr, respectively (Chromatographic separation 1 in the process shown in FIG. 3). At the same time, the purified recovered solution and waste were obtained. The operation temperature was ordinary temperature (15° C.). The results obtained at the steady operation 24 hours after passing the liquid are shown in Table 5.

TABLE 5

|  | Raw solution | Recovered solution | Waste |
|---|---|---|---|
| Flow rate (liter/hr) | 16.23 | 25.54 | 26.38 |
| VC concentration (W/V %) | 19.30 | 11.98 | 0.16 |
| 2KGA concentration (W/V %) | 2.15 | 0.00 | 1.28 |
| FFA concentration (W/V %) | 0.32 | 0.01 | 0.23 |
| NaCl concentration (W/V %) | 1.48 | 0.22 | 0.68 |
| Recovery ratio of VC (%) | — | 98.9 | 1.1 |

When the crystals were obtained in the same manner as in Example 3 without any chromatographic separation of the raw solution, the solution could be concentrated to a concentration ratio of 50.5%, the purity of the obtained crystals was 97.1%, and the crystallization yield was 59.6%.

On the other hand, the purity of the crystals obtained by subjecting the recovered solution obtained in Example 5 to concentration (the concentration ratio: 56.5%), crystallization, separation, washing and drying was 100.0%, and the crystallization yield was 74.0%.

What is claimed is:

1. A process for producing purified L-ascorbic acid from a crystallization mother liquor which comprises subjecting an aqueous solution of said mother liquor to column chromatography using a strongly acidic cation exchange resin, and wherein the column chromatography is conducted by a simulated moving bed process.

2. The process according to claim 1, wherein the aqueous solution of crude L-ascorbic acid contains 2-keto-L-gulonic acid.

3. The process according to claim 2, wherein the aqueous solution of crude L-ascorbic acid additionally contains furoylformic acid and sodium chloride.

4. The process according to claim 1, wherein the aqueous solution of crude L-ascorbic acid contains L-ascorbic acid in 0.01 to 50 W/V % and 2-keto-L-gulonic acid in 0 to 10 W/V %.

5. The process according to claim 1, wherein the aqueous solution of crude L-ascorbic acid is a mother liquor obtained in crystallization in a production process of L-ascorbic acid.

6. The process according to claim 1, wherein the unit operation of the simulated moving bed process comprises two stages of (1) a feed - withdrawal stage which comprises supplying a feed stock and an eluant to beds, and at the same time withdrawing a non-adsorptive fluid and an adsorptive fluid; and (2) a circulation stage which comprises moving the fluid in the beds in the downstream direction without supplying the fluid to the packed beds and without withdrawing the fluid from the packed beds.

7. A method of purifying L-ascorbic acid from a crystallization mother liquor, which comprises subjecting an aqueous solution of said mother liquor to column chromatography using a strongly acidic cation exchange resin, and wherein the column chromatography is conducted by a simulated moving bed process.

8. A process for recovering residual L-ascorbic acid from a crystallization mother liquor comprising:

subjecting an aqueous solution of said mother liquor to column chromatography using a strongly acidic cation exchange resin, and wherein the column chromatoaraphy is conducted by a simulated moving bed process.

9. A process according to claim 8, wherein said mother liquor contains 2-keto-L-gulonic acid.

10. A process according to claim 9, wherein the mother liquor further comprises furoylformic acid and sodium chloride.

11. A process according to claim 8, wherein the mother liquor contains L-ascorbic acid in 0.01 to 50 W/V % and 2-keto-L-gulonic acid in 0 to 10 W/V %.

12. A process according to claim 8, wherein the unit operation of the simulated moving bed process comprises two stages of (1) a feed-withdrawal stage which comprises supplying a feed stock and an eluant to beds, and at the same time withdrawing a non-adsorptive fluid and an adsorptive fluid; and (2) a circulation stage which comprises moving the fluid in the beds in the downstream direction without supplying the fluid to the packed beds and without withdrawing the fluid from the packed beds.

* * * * *

UNITED STATES PATENT AND TRADEMARK OFFICE
CERTIFICATE OF CORRECTION

PATENT NO.   : 5,817,238
DATED        : October 6, 1998
INVENTOR(S)  : Kaoru MAKINO et al.

It is certified that error appears in the above-identified patent and that said Letters Patent is hereby corrected as shown below:

Item [73] Assignee, insert second assignee; --TAKEDA CHEMICAL INDUSTRIES, LTD, Osaka, Japan--.

Signed and Sealed this

Fourth Day of April, 2000

Attest:

Q. TODD DICKINSON

Attesting Officer

Director of Patents and Trademarks